(12) United States Patent
Takasugi et al.

(10) Patent No.: US 8,085,505 B2
(45) Date of Patent: Dec. 27, 2011

(54) MAGNETIC HEAD SUSPENSION

(75) Inventors: Satoru Takasugi, Kyoto-fu (JP); Yasuo Fujimoto, Kyoto-fu (JP)

(73) Assignee: Suncall Corporation, Kyoto-Fu (JP)

( * ) Notice: Subject to any disclaimer, the term of this patent is extended or adjusted under 35 U.S.C. 154(b) by 593 days.

(21) Appl. No.: 12/255,463

(22) Filed: Oct. 21, 2008

(65) Prior Publication Data

US 2009/0103212 A1 Apr. 23, 2009

(30) Foreign Application Priority Data

Oct. 22, 2007 (JP) ................. 2007-274147

(51) Int. Cl.
*G11B 5/48* (2006.01)

(52) U.S. Cl. ............... 360/244.2; 360/244.8; 360/244.3; 360/244.5

(58) Field of Classification Search ............... 360/244.2, 360/244.8, 244.3, 244.5, 266, 294.4, 245.3
See application file for complete search history.

(56) References Cited

U.S. PATENT DOCUMENTS 7,245,457 B2 * 7/2007 Kuroki et al. ............... 360/244.2

FOREIGN PATENT DOCUMENTS

| JP | 09-082052 | 3/1997 |
| JP | 11-039808 | 2/1999 |
| JP | 2004-348804 | 12/2004 |
| JP | 2005-174506 | 6/2005 |

* cited by examiner

*Primary Examiner* — David Lam

(74) *Attorney, Agent, or Firm* — Sterne, Kessler, Goldstein & Fox PLLC

(57) ABSTRACT

An elastic plate connected at both ends to a pair of supporting pieces of a supporting portion and connected at center to a member forming a load beam portion functions as a load bending portion. A balance mass member is mounted on a portion of the member forming the load beam portion positioned on a base-end side from the elastic plate. A narrowest portion of the supporting portion is positioned, with respect to the suspension lengthwise direction, between a position of a base-end of a concave portion defined the pair of supporting pieces and a position where phantom lines extending from inner side edges of arm areas of the supporting pieces intersect with a longitudinal center line of the suspension, thereby effectively reducing mass of tip-end side of the supporting portion without deteriorating rigidity of the supporting pieces.

5 Claims, 10 Drawing Sheets

(a)

(b)

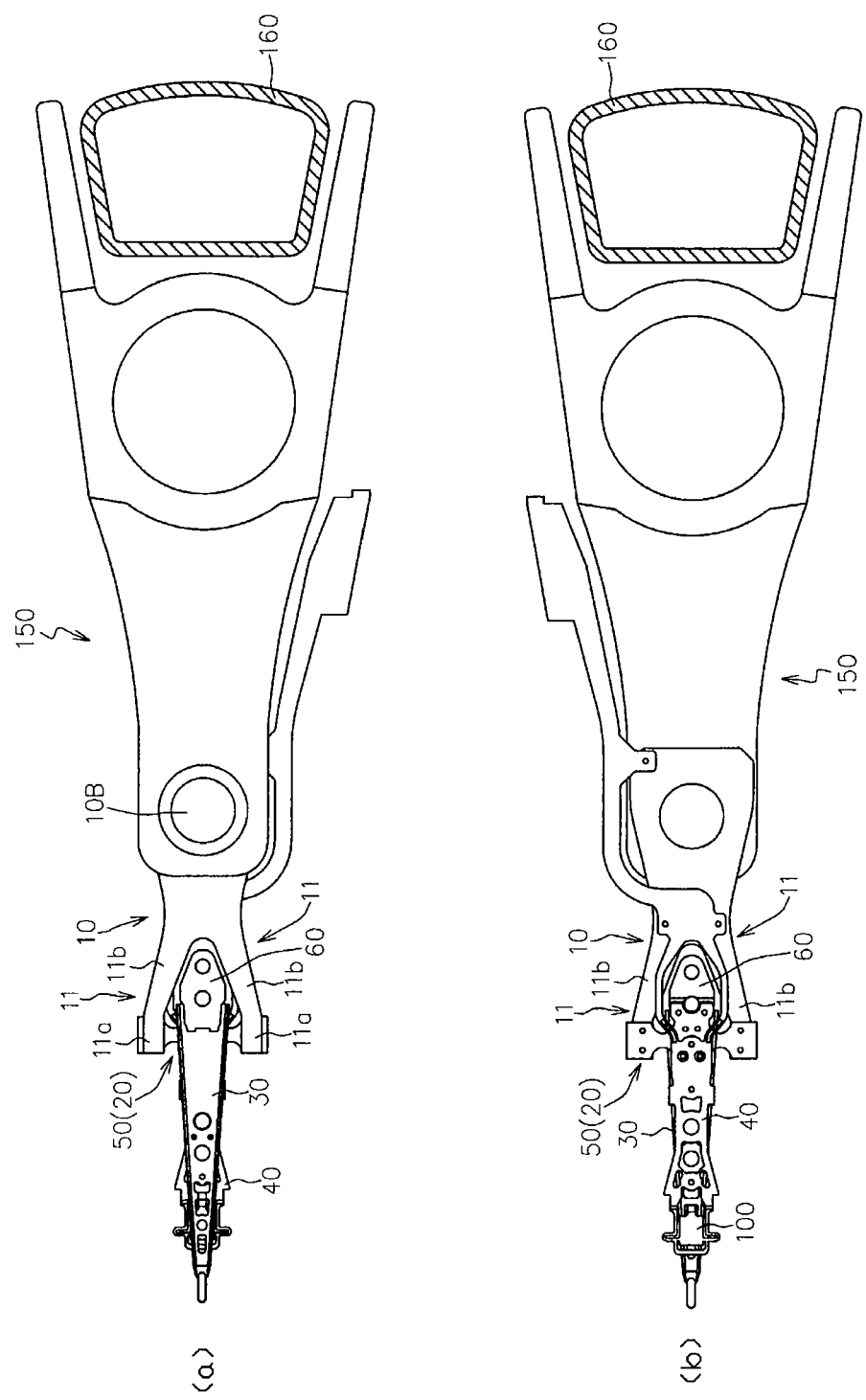

MAGNETIC HEAD SUSPENSION

BACKGROUND OF THE INVENTION

1. Field of the Invention

The present invention relates to a magnetic head suspension for supporting a magnetic head slider that reads and/or writes data from and to a recording medium such as a hard disk device.

2. Related Art

In recent years, data storage devices for reading and/or writing data from and to recording mediums through a magnetic head slider have been widely used in mobile apparatuses such as notebook-type personal computers and portable music players and, along therewith, these data storage devices have been required to have high impact resistance.

For example, when a data storage device in which a pair of suspensions supporting magnetic head sliders are respectively positioned on an upper side and a lower side of a hard disk is dropped on a floor surface, the date storage device is subjected to an impulsive force.

When acceleration of the impulsive force is equal to or greater than a certain value, the magnetic head slider positioned on the lower side of the disk jumps away from the disk, and then swings back toward a disk surface of the disk to clash with the disk surface, resulting in damage of the disk surface. Accordingly, in order to increase the impact resistance of the data storage device, there is a need for enhancing impact resistance against jumping motion of the magnetic head slider so that acceleration of an impulsive force which triggers the jumping motion of the magnetic head slider is raised (that is, so that the jump motion of the magnetic head slider is prevented even if the impulsive force with greater acceleration is applied).

By the way, when the data storage device is dropped on the floor surface, the magnetic head slider positioned on the upper side of the disk is subjected to an impulsive force causing the slider to move in a direction close to the disk surface. However, an air film between the slider and the disk surface functions as buffer member, thereby effectively preventing the slider from clashing with the disk surface.

For example, by increasing load which presses the magnetic head slider toward the disk surface, it is possible to enhance impact resistance against jumping motion of the magnetic head slider.

However, it is necessary to set the load within a proper range, in order to control the height of the magnetic head slider above the disk surface. Accordingly, there is naturally a limit to the method in which the load is increased for suppressing the jumping motion of the magnetic head slider.

As another structure for suppressing the jumping motion of the magnetic head slider, there is also known a structure in which a mass of a load beam portion is reduced so that an inertia force of the load beam portion when an impulsive force is applied thereto is reduced, thus enhancing impact resistance against the jumping motion of the magnetic head slider.

However, reduction of the thickness of the load beam portion and/or formation of a hole in the load beam portion in order to reduce the mass of the load beam portion, would involve deterioration of rigidity of the load beam portion, thus inducing the problem of degradation of the vibration characteristics and the loading/unloading characteristics.

As still another structure for suppressing the jumping motion of the magnetic head slider, there has been proposed a structure in which the load beam portion supported through a load bending portion by a supporting portion such as an arm or a base plate is formed to have an extending portion extending toward the base-end side of the suspension (for example, see Japanese unexamined patent publication No. H9-082052, Japanese unexamined patent publication No. H11-039808, Japanese unexamined patent publication No. 2004-348804, and Japanese unexamined patent publication No. 2005-174506, which are hereinafter referred to as patent documents 1-4, respectively).

The conventional structure described in each of the patent documents 1-4 is configured so as make a mass of a portion of the load beam portion which is positioned on a base-end side in a suspension longitudinal direction from the load bending portion to be as equal as possible to a mass of a portion thereof which is positioned on a tip-end side of the suspension longitudinal direction from the load bending portion. The structure is advantageous in suppressing the jumping motion of the magnetic head slider at a time when being subjected to the external impulsive force, without degrading the rigidity of the load beam portion.

However, in the magnetic head suspensions described in each of the patent documents, the load beam portion is connected to a free end portion of the load bending portion, which is supported by the supporting portion in a cantilever manner. With the structure, the supporting point of the load beam portion (namely, the portion of the load beam portion which is connected to the load bending portion) may vary in the direction orthogonal to the disk surface when an impulsive force is applied thereto.

Accordingly, the magnetic head suspensions described in each of the patent documents can not sufficiently enhance impact resistance against the jumping motion of the magnetic head slider, although the problem of degradation of the rigidity of the load beam portion does not occur.

In the structure in which the load beam portion is provided with the extending portion, there has been proposed a structure in which the supporting portion is provided with a pair of supporting pieces at its tip end, the extending portion of the load beam portion is positioned within a concave portion which is defined by the pair of supporting pieces, and a balance mass member is mounted on the extending portion (see, for example, patent document 1).

Although the conventional structure is advantageous in that the mass of the tip-end side and the mass of the base-end side of the load beam portion could be effectively balanced to each other by the balance mass member, it has, on the other hand, a following problem. Specifically, the pair of supporting pieces are formed to be substantially parallel to a longitudinal center line of the magnetic head suspension so that the inertia force of the pair of supporting pieces around the longitudinal center line is increased, resulting in a problem of making it difficult to enhance resonance frequency in torsion secondary mode and torsion tertiary mode.

Furthermore, in the conventional structure, the pair of supporting pieces respectively support proximal end portions of a pair of leaf springs functioning as the load bending portion in a cantilever manner, and a proximal end portion of the load beam is connected to distal end portions of the pair of leaf springs.

That is, in the conventional structure disclosed in patent document 1, the pair of supporting pieces support the load beam portion in a cantilever manner through the pair of leaf springs. In the conventional structure, it is needed to increase width and/or thickness of the pair of supporting pieces in order to ensure rigidity of the pair of supporting pieces.

However, increase of width and/or thickness of the pair of supporting pieces involves increased mass of the distal end portion of the supporting portion, resulting in a problem that the distal end portion of the supporting portion is easy to be displaced in a direction close to the disk surface when being subjected to an impulsive force that causes the magnetic head slider to move in a direction close to the disk surface. Specifically, increase of width and/or thickness of the pair of supporting pieces results in reduction of acceleration of impulsive force that causes the balancer mass member to clash with the disk surface (that is, clash of the balancer mass member with the disk surface by impulsive force with lowered acceleration), thereby deteriorating impact resistance against the clashing motion of the balancer mass member.

SUMMARY OF THE INVENTION

The present invention is made in view of the conventional techniques and aims to provide a magnetic head suspension capable of enhancing impact resistance against jumping motion of the magnetic head slider and impact resistance against clashing motion of the balancer mass member while raising resonance frequency.

The present invention provide, in order to achieve the aim, a magnetic head suspension that includes a load bending portion generating a load for pressing a magnetic head slider toward a disk surface, a load beam portion transmitting the load to the magnetic head slider, a supporting portion supporting the load beam portion through the load bending portion, and a flexure portion connected to the load beam portion and supporting the magnetic head slider, wherein the supporting portion includes a main-body portion, and a pair of supporting pieces extending from opposite sides of the main-body portion in a suspension widthwise direction toward a tip-end side in a suspension lengthwise direction so as to define a concave portion therebetween which is opened toward the tip-end side in the suspension lengthwise direction, the supporting pieces being symmetric to each other with a longitudinal center line of the suspension as a reference, and the magnetic head suspension further includes an elastically-deformable elastic plate and a balance mass member.

The elastic plate includes first and second connected areas which are respectively connected to the pair of supporting pieces and a center area which extends between the first and second connected areas and to which a member forming the load beam portion is connected, the elastic plate functioning as the load bending portion by elastically deformed around a load bending center line along the suspension widthwise direction.

The balance mass member is supported by a portion of the member forming the load beam portion which is positioned on a base-end side than the elastic plate in the suspension lengthwise direction so as to be positioned within the concave portion in a plan view or as viewed from above.

The pair of supporting pieces includes supporting areas to which the elastic plate is connected at the first and second connected areas, and arm areas which are positioned on the base-end side in the suspension lengthwise direction from the supporting areas, the arm areas having a width which becomes wider as it advances from the tip-end side to the base-end side in a state that both of its inner side edge and outer side edge come close to the longitudinal center line as they advance from the tip-end side to the base-end side.

The supporting portion has such a shape that its width becomes narrower according to the shape of the outer side edges of the arm areas as it advances from the tip-end side to the base-end side, becomes narrowest at a narrowest portion and then becomes wider as it advances from the tip-end side to the base-end side after passing the narrowest portion.

The narrowest portion is positioned, with respect to the suspension lengthwise direction, between a position of a base-end of the concave portion and a position where phantom lines extending from the inner side edges of the arm areas intersect with the longitudinal center line.

In the magnetic head suspension according to the present invention, the elastic plate in which the first connected area on a first end side and the second connected area on a second end side are respectively connected to the pair of supporting pieces of the supporting portion is elastically twisted back around the load bending center line along the suspension widthwise direction so that it generates the load for pressing the magnetic head slider toward the disk surface. The thus configured magnetic head suspension according to the present invention makes it possible to enhance impact resistance against jumping motion of the magnetic head slider in comparison with a conventional magnetic head suspension in which the load bending portion is supported by the supporting portion in a cantilever manner and the load beam portion is supported by the load bending portion in a cantilever manner.

Further, in the magnetic head suspension according to the present invention, the balance mass member is mounted on the portion of the member forming the load beam portion which is positioned on the base-end side in the suspension lengthwise direction from the elastic plate so that the balance mass member is positioned within the concave portion between the pair of supporting pieces of the supporting portion in a plan view or as vied from the above. The thus configured magnetic head suspension according to the present invention makes it possible to enhance impact resistance against clashing motion of the balance mass member while equilibrating mass between the tip-end side and the base-end side of the load beam portion thanks to the balance mass member.

Furthermore, in the magnetic head suspension according to the present invention, the supporting portion has such a shape that its width becomes narrower according to the shape of the outer side edges of the arm areas as it advances from the tip-end side to the base-end side, becomes narrowest at a narrowest portion and then becomes wider as it advances from the tip-end side to the base-end side after passing the narrowest portion. The narrowest portion is positioned, with respect to the suspension lengthwise direction, between a position of a base-end of the concave portion and a position where phantom lines extending from the inner side edges of the arm areas intersect with the longitudinal center line. The thus configured magnetic head suspension according to the present invention makes it possible to effectively reduce mass of the tip-end side of the supporting portion without deteriorating rigidity of the supporting pieces, thereby achieving an effect of effectively raising resonance frequency in addition to the above effects.

Preferably, a width Wm between the right and left outer side edges of the narrowest portion and a width Wd between the right and left outer side edges at tip ends of the pair of supporting pieces have a relationship of $0.5 \leq Wm/Wd \leq 0.8$.

In one embodiment, the supporting portion is an arm having a base end fixed to a pivot of an actuator.

In another embodiment, the supporting portion is a base plate having a base end fixed to a tip end of an E block, which is driven by an actuator.

In each of the above various configurations, the center area of the elastic plate may include a center connected portion to which the member forming the load beam portion is connected, a first extending portion extending between the center connected portion and the first connected area, and a second extending portion extending between the center connected portion and the second connected area, the first and second extending portions being symmetrical to each other with the longitudinal center line CL as a reference.

BRIEF DESCRIPTION OF THE DRAWINGS

The above, and other objects, features and advantages of the present invention will become apparent from the detailed description thereof in conjunction with the accompanying drawings wherein.

FIGS. 10(a) and 10(b) are a top view and a bottom view of a magnetic head suspension in which an E block is used as the supporting portion, respectively.

DETAILED DESCRIPTION OF THE PREFERRED EMBODIMENTS

Hereinafter, one preferred embodiment of a magnetic head suspension according to the present invention will be described, with reference to the attached drawings.

Figure 1:
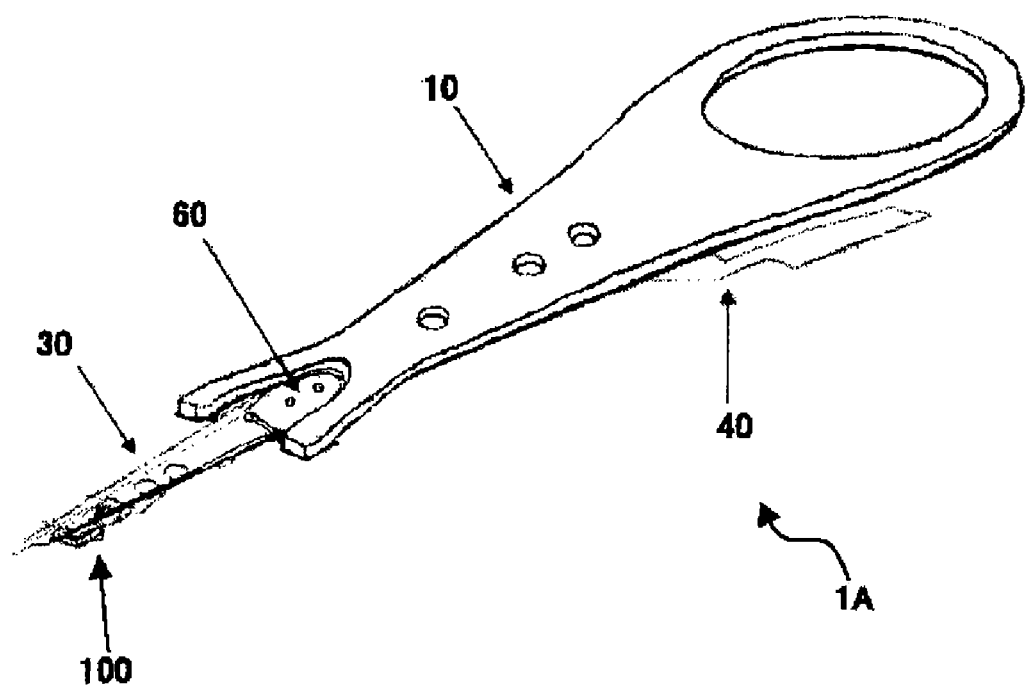
FIG. 1 is a perspective top view of a magnetic head suspension according to one embodiment of the present invention, as viewed from a side opposite from a disk surface.

FIG. 1 is a perspective top view of a magnetic head suspension 1A according to the present embodiment as viewed from a side opposite from a disk surface with the magnetic head suspension as a reference.

Figure 2:
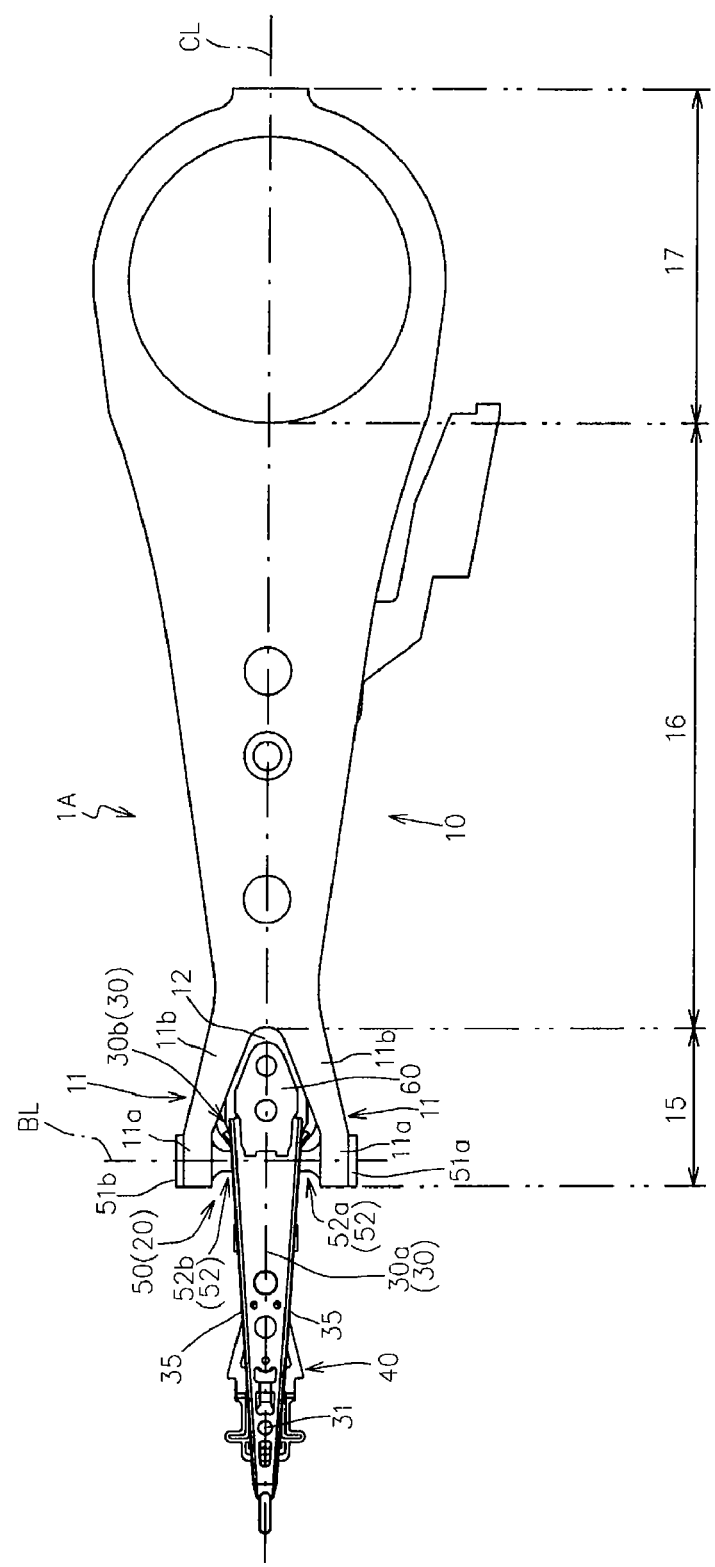
FIG. 2 is a top view (a plan view as viewed from the side opposite from the disk surface) of the magnetic head suspension shown in FIG. 1.
Figure 3:
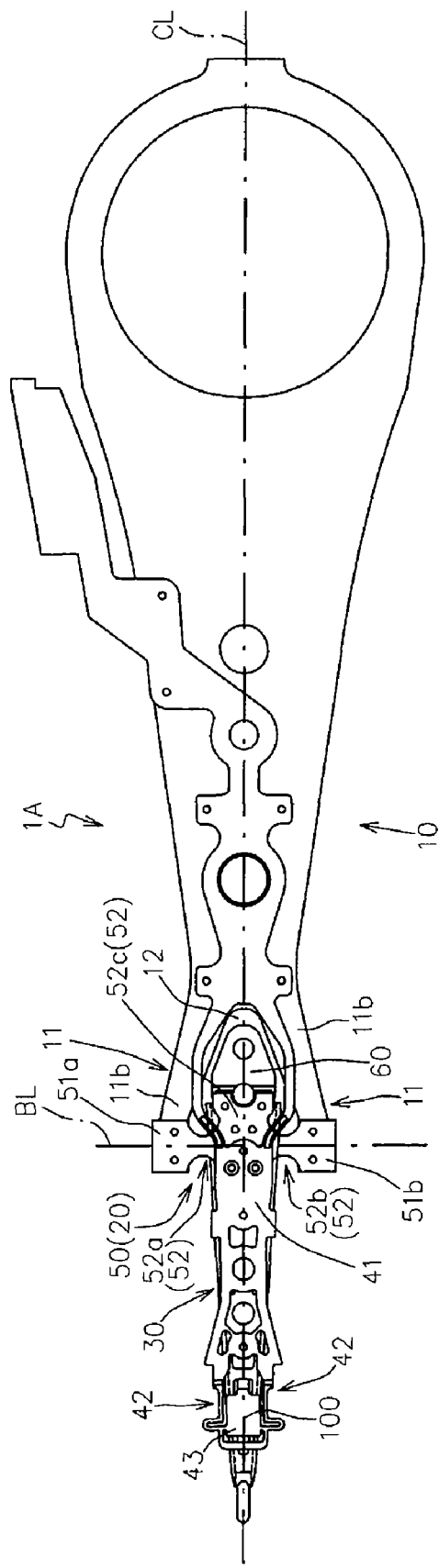
FIG. 3 is a bottom view (a bottom view as viewed from a side close to the disk surface) of the magnetic head suspension shown in FIGS. 1 and 2.

FIGS. 2 and 3 are a top view (a view as viewed from the side opposite from the disk surface) and a bottom view (a view as viewed from a side close to the disk surface) of the magnetic head suspension 1A, respectively.

The magnetic head suspension 1A includes a load bending portion 20 which generates a load for pressing a magnetic head slider 100 toward the disk surface, a load beam portion 30 which transmits the load to the magnetic head slider 100, a supporting portion 10 which supports the load beam portion 30 through the load bending portion 20, and a flexure portion 40 which is connected to the load beam portion 30 and supports the magnetic head slider 100.

The supporting portion 10 includes a main-body portion, and a pair of supporting pieces 11 extending toward a tip-end side in a suspension lengthwise direction from the opposite sides of the main-body portion in a suspension widthwise direction, the pair of supporting pieces 11 defining a concave portion 12 that opens to the tip-end side in the suspension lengthwise direction, as illustrated in FIGS. 1-3.

The pair of supporting pieces 11 are symmetric to each other with a longitudinal center line CL of the magnetic head suspension 1A as a reference, as shown in FIG. 2.

In the present embodiment, as shown in FIGS. 1-3, the supporting portion 10 is formed to be an arm having a proximal end fixed to a pivot of an actuator. The supporting portion 10 can be formed from a stainless-steel plate having a thickness in the range of about 0.1 mm to 0.8 mm.

The detailed configuration of the supporting portion 10 will be explained later.

The load beam portion 30 is a member for transmitting the load generated by the load bending portion 20 to the magnetic head slider 100 as described above and, therefore, is required to have a predetermined rigidity.

The load beam portion 30 could have the predetermined rigidity by being formed from a member having a thickness greater than those of the load bending portion 20 and the flexure portion 40, or by being provided with below mentioned flange portions 35 at its opposite sides in the suspension widthwise direction while having a thickness substantially same as that of flexure portion 40.

In the present embodiment, the load beam portion 30 has flange portions at the opposite sides. The load beam portion 30 may be formed, for example, from a stainless-steel plate having a thickness in the range of about 0.02 mm to 0.1 mm.

The load beam portion 30 is provided, at its tip-end portion, with a protrusion 31 which is a so-called dimple.

The protrusion 31 is protruded by, for example, about 0.05 mm to 0.1 mm, in such a direction that it comes close to the disk surface. The protrusion 31 is brought into contact with a back surface (a surface opposite from the disk surface) of a head mounting area 43 of the flexure portion 40, so that the load is transmitted to the head mounting area 43 of the flexure portion 40 through the protrusion 31.

The flexure portion 40 is connected to the load beam portion 30 in a state where it supports the magnetic head slider 100.

Specifically, as shown in FIG. 3, the flexure portion 40 includes a main-body area 41 connected to a lower surface (a surface which faces the disk surface) of the load beam portion 30 by welding or the like, a pair of supporting pieces 42 extending toward the tip-end side in the suspension lengthwise direction from the main-body area 41, and the head mounting area 43 supported by the supporting pieces 42.

The head mounting area 43 supports the magnetic head slider 100 at its surface which faces the disk surface.

As described above, the protrusion 31 is brought into contact with the back surface of the head mounting area 43, which allows the head mounting area 43 to sway flexibly in a roll direction and in a pitch direction, with the protrusion 31 used as a fulcrum.

The flexure portion 40 is formed from a member having rigidity lower than that of the load beam portion 30, in order to allow the head mounting area 43 to swing in the roll direction and the pitch direction. The flexure portion 40 may be formed from a stainless-steel plate having a thickness in the range of about 0.015 mm to 0.025 mm, for example.

The flexure portion 40 may be provided with wiring in form of printed circuit for transmitting writing signal and reading signal to the magnetic head slider 100.

As shown in FIGS. 2 and 3, the magnetic head suspension 1A further includes an elastic plate 50 supported by the pair of supporting pieces 11 of the supporting portion 10 in a both-ends supported manner (which means that first and second ends of the elastic plate 50 are supported by the pair of supporting pieces 11, respectively).

The elastic plate 50 includes first and second connected areas 51a and 51b which are connected to the pair of supporting pieces 11, respectively, and a center area 52 which extends between the first and second connected areas 51a and 51b and to which the load beam portion 30 is connected.

The center area 52 is elastically deformed around a load bending center line BL along the suspension widthwise direction in a state where the first and second connected areas 51a and 51b are bound by being respectively connected to the pair of supporting pieces 11, so that the elastic plate 50 functions as the load bending portion 20.

For example, the elastic plate 50 may be twisted so that the tip end of the center area 52 comes close to the disk surface in a state before the magnetic head suspension 1A is mounted to the data storage device, and be elastically deformed so that the tip end of the center area 52 is twisted back in a state that the magnetic head suspension 1A is mounted to the data storage device, that is, the elastic plate 50 may be elastically deformed so that the center area 52 and the load beam portion 30 connected thereto are substantially parallel to the disk surface in a state that the magnetic head suspension 1A is mounted to the data storage device, whereby the elastic plate 50 functions as the load bending portion 20.

As described above, the magnetic head suspension 1A according to the present embodiment is configured so that the elastic plate 50 which is supported at its opposite ends functions as the load bending portion 20, thereby offering effects as follows.

That is, in a conventional magnetic head suspension, a load bending portion is formed to be a cantilever spring which is supported at its base end portion by a supporting portion such as an arm and with supports a load beam portion at its free end portion.

With this conventional structure, when an external impulsive force is applied thereto, this will largely vary the supporting point of the load beam portion (namely, the point of the load beam portion which is connected to the load bending portion), in a direction orthogonal to the disk surface. Accordingly, even if the weight of the load beam portion is reduced without involving the reduction of the rigidity thereof and/or the masses of the tip end side and the base end side of the load beam portion with the supporting point of the load beam portion as a reference are balanced to each other, it is impossible to sufficiently suppress the jumping motion of the magnetic head slider in the direction orthogonal to the disk surface.

On the contrary, the magnetic head suspension 1A according to the present embodiment is configured so that the elastic plate 50 supported at its opposite ends functions as the load bending portion 20.

With this structure, when an external impulsive force is applied thereto, it is possible to effectively prevent the supporting point of the load beam portion 30 (namely, the point of a member forming the load beam portion 30 which is connected to the elastic member 50) from varying in the direction orthogonal to the disk surface, thus substantially enhancing impact resistance against jumping motion of the magnetic head slider 100.

The elastic plate 50 is made from a member capable of generating the load by its elastically twisting movement. The elastic plate 50 may be preferably formed from, for example, a stainless-steel plate having a thickness in the range of about 0.02 mm to 0.1 mm.

The center area 52 of the elastic plate 50 may preferably include a center connected portion to which the member forming the load beam portion 30 is connected, a first extending portion 52a extending between the center connected portion and the first connected area 51a, and a second extending portion 52b extending between the center connected portion and the second connected area 51b, the second extending portion 52b being symmetrical to the first extending portion 52a with the longitudinal center line CL of the magnetic head suspension 1A as a reference, wherein the first and second extending portions 52a, 52b have cutouts which is curved circularly in a plan view at their distal edges and proximal edges.

The preferable configuration makes it possible to alleviate stress concentration in the twisting motion of the elastic plate 50 around the load bending center line BL, thereby reducing loss of load.

As shown in FIGS. 1-3, the magnetic head suspension according to the present embodiment further includes a balance mass member 60 supported by a portion of the member forming the load beam portion 30 which is positioned on a base-end side from the load bending center line BL of the elastic plate 50 in the suspension lengthwise direction so as to be positioned within the concave portion 12 in a plan view or as viewed from above, thereby effectively balancing the mass of the tip-end side to the mass of the base-end side of the load beam portion 30 with the elastic plate 50 as a reference.

Specifically, the member forming the load beam portion 30 includes a connected area connected to the center area 52 of the elastic plate 50, a tip-end area 30a extending from the connected area toward the tip-end side in the suspension lengthwise direction, and a base-end area 30b extending from the connected area toward the base-end side in the suspension lengthwise direction so as to be positioned within the concave portion 12 in a plan view.

As described above, in the present embodiment, the member forming the load beam portion 30 has the flange portions 35 at the opposite sides thereof in the suspension widthwise direction, the flange portions extending in the suspension lengthwise direction so as to be across the elastic plate 50.

Preferably, the flange portions 35 are configured such that their heights gradually decrease as it goes from the base-end side to the tip-end side.

With this structure, it is possible to enhance rigidity of the load beam portion 30 while preventing increase of the mass of the tip-end side of the load beam portion 30, which leads to reduction of acceleration of impulsive force triggering the jumping motion of the magnetic head slider 100 (that is, which leads to deterioration of impact resistance against the jumping motion of the magnetic head slider 100).

The balance mass member 60 is fixed to the base-end area 30b of the load beam portion 30 so as to be positioned within the concave portion 12 in a plan view or as viewed from the above, as shown in FIGS. 1-3.

By providing the balance mass member 60, it is possible to balance the mass of the portion of the load beam portion 30 which is positioned on the base-end side in the suspension lengthwise direction from the elastic plate 50 with the mass of the portion of the load beam portion 30 which is positioned on the tip-end side in the suspension lengthwise direction from the elastic plate 50 while reducing the length of the base-end area 30b as much as possible, thereby enhancing impact resistance against the jumping motion of the magnetic head slider 100.

The provision of the balancer mass member 60 also makes it possible to prevent occurrence of vibration mode due to the existence of the base-end area 30b in comparison with a configuration in which the base-end area 30b has such a length that the mass of the tip-end side of the load beam portion 30 and the mass of the base-end side thereof are substantially equal to each other without the balance mass member 60.

The balance mass member 60 may be formed, for example, from a stainless-steel plate having a thickness in the range of about 0.05 mm to 0.4 mm.

As shown in FIGS. 1-3, in the magnetic head suspension 1A, the flexure portion 40, the elastic plate 50, the load bear portion 30 and the balance mass member 60 are portioned in this order in a direction away from the disk surface.

Specifically, the elastic member 50 is connected to lower surfaces (which are surfaces facing the disk surface) of the pair of supporting pieces 11. The load beam portion 30 is connected to an upper surface (which is a surface on a side opposite from the disk surface) of the elastic plate 50, and the flexure portion 40 is connected to lower surfaces (which are surfaces facing the disk surface) of the elastic plate 50 and the load beam portion 30. The pair of flange portion 35 of the load beam portion 30 are bent up, and the balance mass member 60 has a tip-end side fixed to the upper surface of the base-end area 30b of the load beam portion 30 between the pair of flange portions 35, and a base-end side extending from the base-end area 30b of the load beam portion 30 toward the base-end side in the suspension lengthwise so as to be positioned within the concave portion 12 in a plan view.

In the present embodiment, since the base-end area 30b of the load beam portion 30 to which the tip-end side of the balance mass member 60 is fixed is provided with the pair of flange portions 35, it is possible to achieve a predetermined rigidity at a portion where the balance mass member 60 is connected to the load beam portion 30.

The detailed configuration of the supporting portion 10 will be now explained.

As shown in FIG. 2, the supporting portion 10 includes a tip-end area 15 having the pair of supporting pieces 11, a base-end area 17 fixed to the pivot of the actuator, and an intermediate area 16 extending between the tip-end area 15 and the base-end area 17. The pair of supporting pieces 11 includes, as shown in FIGS. 2 and 3, supporting areas 11a to which the elastic plate 50 is connected, and arm areas 11b extending from the supporting areas 11a toward the base-end side in the suspension lengthwise direction.

Figure 4:
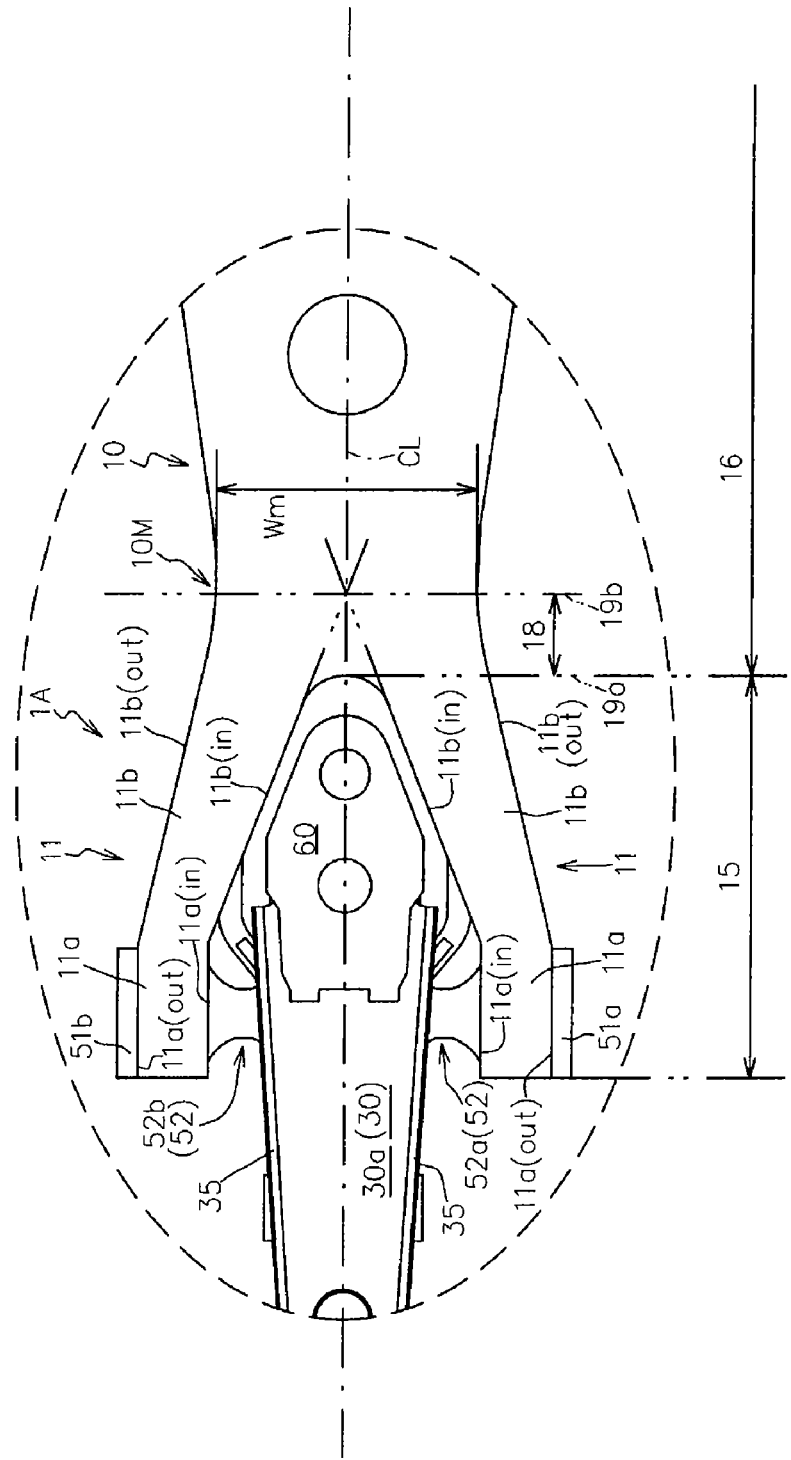
FIG. 4 is an enlarged top view of a tip-end side of a supporting portion of the magnetic head suspension shown in FIGS. 1-3.

FIG. 4 is an enlarged top view in the vicinity of the supporting pieces 11.

As shown in FIG. 4, the arm area 11b has a width which becomes wider as it advances from the tip-end side to the base-end side in the suspension lengthwise direction in a state that both its inner side edge 11b(in) and outer side edge 11b(out) come close to the longitudinal center line CL as they advance from the tip-end side to the base-end side, thereby securing an enough mounting space for the elastic plate 50 while ensuring rigidity of the pair of supporting pieces 11, as well as reducing moment of inertia of the pair of supporting pieces 11 around the longitudinal center line CL as much as possible.

In the present embodiment, the inner side edge 11b(in) is inclined so as to come close to the longitudinal center line CL as it advances from the tip-end side to the base-end side. In a same manner, the outer side edge 11b(out) is inclined so as to come close to the longitudinal center line CL as it advances from the tip-end side to the base-end side. An inclined angle of the outer side edge 11b(out) relative to the longitudinal center line CL is smaller than that of the inner side edge 11b(in), so that the arm area 11b has the width which becomes wider as it advances from the tip-end side to the base-end side.

Now, the effect by the configuration in which the arm area 11b has a width which becomes wider as it advances from the tip-end side to the base-end side in a state that both its inner side edge 11b(in) and outer side edge 11b(out) come close to the longitudinal center line CL as they advance from the tip-end side to the base-end side will now be explained in detail.

Figure 5:
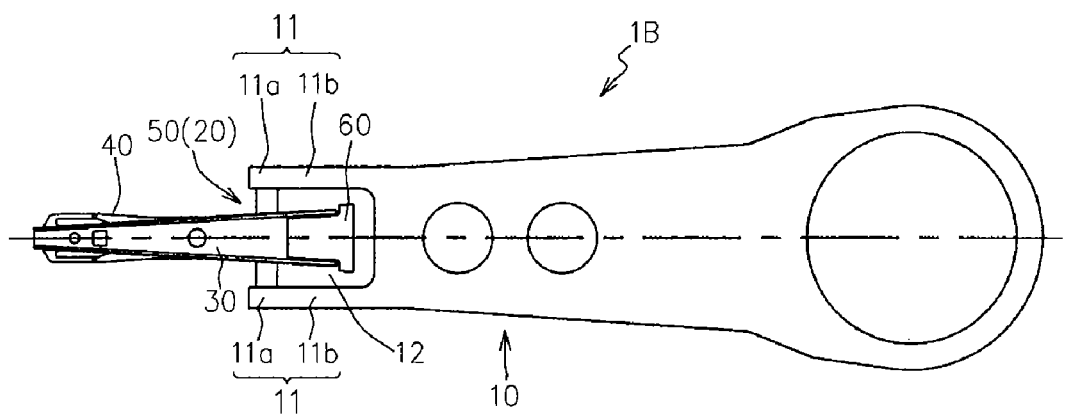
FIGS. 5(a) and 5(b) are a top view and a bottom view of a magnetic head suspension according to a modified embodiment of the present invention, respectively.
Figure 5:
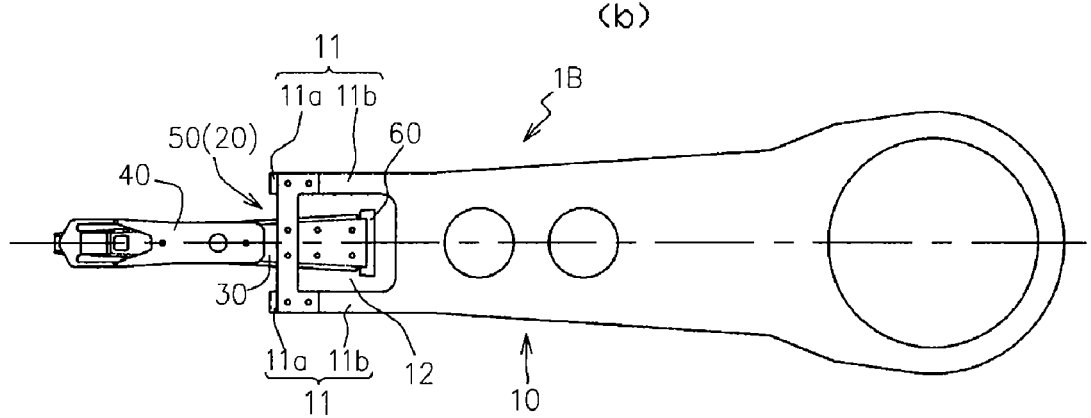
Figure 6:
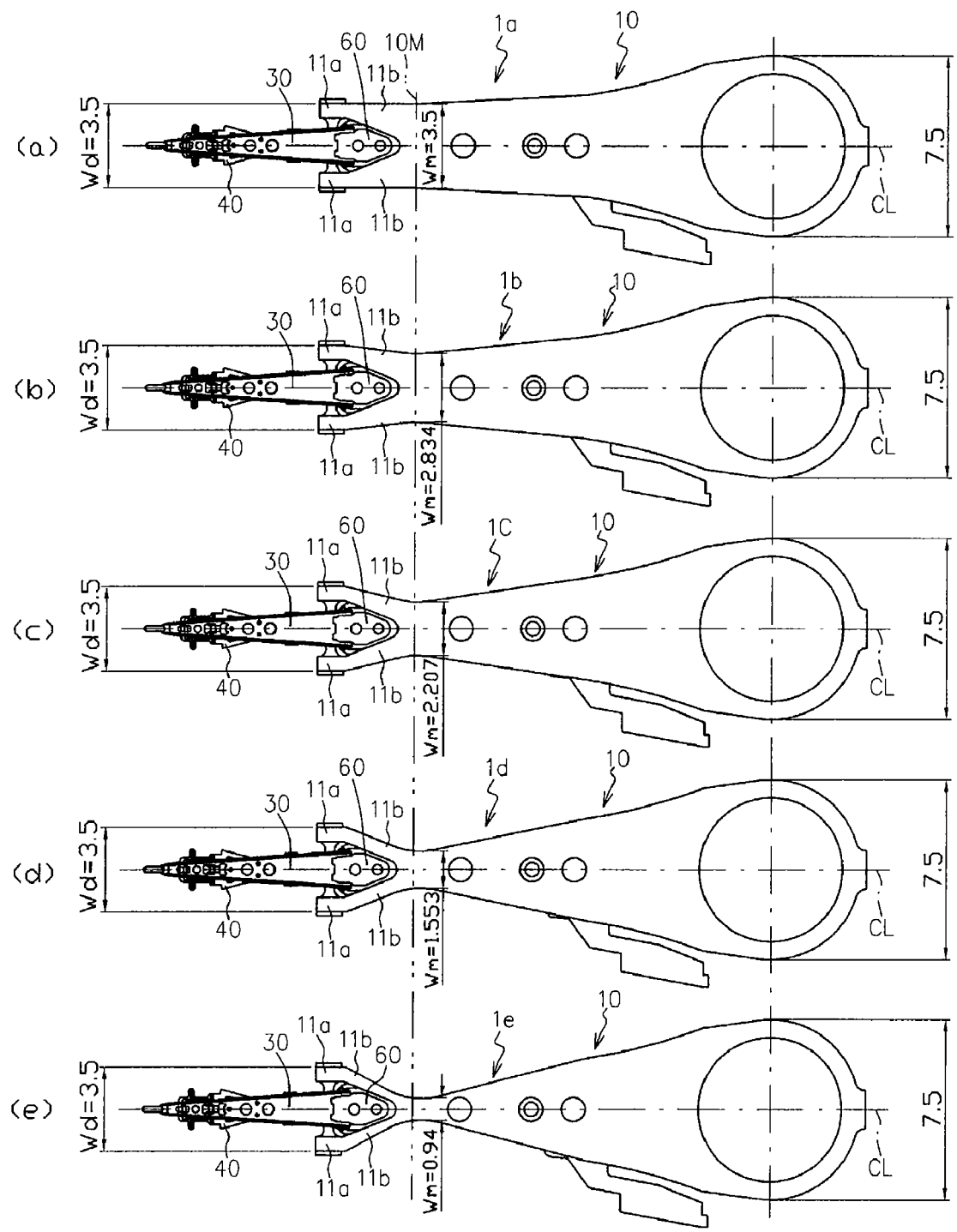
FIGS. 6(a)-6(e) are top views of magnetic head suspensions used in analyses on the basis of a finite-element method.

Provided that the inner side edge of the arm area 11b is parallel to the longitudinal center line CL as shown in FIG. 5, an opening width at the base-end side of the concave portion 12 is same as that at the tip-end side.

In the magnetic head suspension 1B shown in FIG. 5, moment of inertia of the arm areas 11b of the pair of supporting pieces 11 around the longitudinal center line CL is increased in comparison to the magnetic head suspension 1A according to the present embodiment, resulting in a possible reduction of the resonance frequency in torsion secondary mode and torsion tertiary mode.

On the contrary, in the magnetic head suspension 1A according to the present embodiment, the arm areas 11b of the pair of supporting pieces 11 are configured so that both the inner side edges 11b(in) and the outer side edges 11b(out) come close to the longitudinal center line CL as they advance from the tip-end side to the base-end side, as described above.

Accordingly, it is possible to reduce moment of inertia of the arm areas 11b around the longitudinal center line CL in comparison to the magnetic head suspension shown in FIG. 5 while securing an enough opening width at the tip-end side of the concave portion 12.

Further, in the magnetic head suspension 1A, the arm areas 11b have the widths that become wider as they advance from the tip-end side to the base-end side, as described above. Accordingly, it is possible to effectively enhance rigidity of the arm areas 11b while preventing increase of the mass of the arm areas 11b.

In the present embodiment, the supporting area 11a is configured so that both of its inner side edge 11a(in) and outer side edge 11a(out) are parallel to the longitudinal center line CL, as shown in FIG. 4. The configuration is made in consideration of workability in connecting the elastic plate 50 to the supporting area 11a.

Instead of the configuration, it is possible to employ a configuration in which the inner side edge 11a(in) and the outer side edge 11a(out) of the supporting area 11a come close to the longitudinal center line CL as they advance from the tip-end side to the base-end side.

Furthermore, in the present embodiment, the elastic plate 50 has the first and second ends respectively connected to the pair of supporting pieces 11, as described above.

The thus configured elastic plate 50 also functions as a member for reinforcing rigidity of the pair of supporting pieces 11. Specifically, the elastic plate 50 also contributes to the effect of effectively enhancing rigidity of the supporting pieces 11 while reducing the mass of the supporting pieces 11 as much as possible.

Furthermore, in the magnetic head suspension 1A, the supporting portion 10 has such a shape that its width (which is a length between its outer side edges) becomes narrower according to the shape of the outer side edges 11b(out) of the arm areas 11b as it advances from the tip-end side to the base-end side, becomes narrowest at a narrowest portion 10M and then becomes wider as it advances from the tip-end side to the base-end side after passing the narrowest portion 10M. The narrowest portion 10M is positioned, with respect to the suspension lengthwise direction, between a position 19a of a base-end of the concave portion 12 and a position where phantom lines extending from the inner side edges 11b(in) of the arm areas 11b intersect with the longitudinal center line CL.

According to the configuration, it is possible to locate the narrowest portion 10M at the tip-end side of the supporting portion 10 as much as possible without deteriorating rigidity of the pair of supporting pieces 11.

Therefore, it is possible to maximally achieve the effect of reduction of moment of inertia of the supporting portion 10 around the longitudinal center line CL thanks to reduction of mass, while enhancing rigidity of the pair of supporting pieces 11.

There will now be described results of analyses with respect to the magnetic head suspension 1A according to the present embodiment, on the basis of a finite-element method.

FIGS. 6(a)-6(e) are top views of magnetic head suspensions 1a-1e used in the analyses, respectively.

The magnetic head suspensions 1a-1e have a same shape one another except for widths of the respective narrowest portions 10M.

Specifically, in each of the magnetic head suspensions 1a-1e, the supporting portion 10, the load beam portion 30, the elastic plate 50 and the flexure portion 40 were all made of stainless-steel plates (SUS304-HTA) having thicknesses of 0.4 mm, 0.02 mm, 0.03 mm and 0.02 mm, respectively.

In each of the all magnetic head suspensions 1a-1e, a width Wd between right and left outer side edges at their tip ends of the pair of supporting pieces 11 was set to 3.5 mm, and a width at a widest portion of the base-end area 17 was set to 7.5 mm.

Further, in each of the all magnetic head suspensions 1a-1e, the position of the narrowest portion 10M in the suspension lengthwise direction was same as the position where phantom lines extending from the inner side edges 11b(in) of the arm areas 11b of the pair of supporting pieces 11 intersect with the longitudinal center line CL.

On the other hand, in the magnetic head suspensions 1a-1e, the widths Wm of the respective narrowest portions were set to 3.5 mm, 2.834 mm, 2.207 mm, 1.553 mm and 0.94 mm.

The analyses were made as follows.

Firstly, analysis regarding impact resistance against impulsive force having such a direction as to press the magnetic head suspension toward the disk surface was made with respect to each of the magnetic head suspensions 1a-1e.

Figure 7:
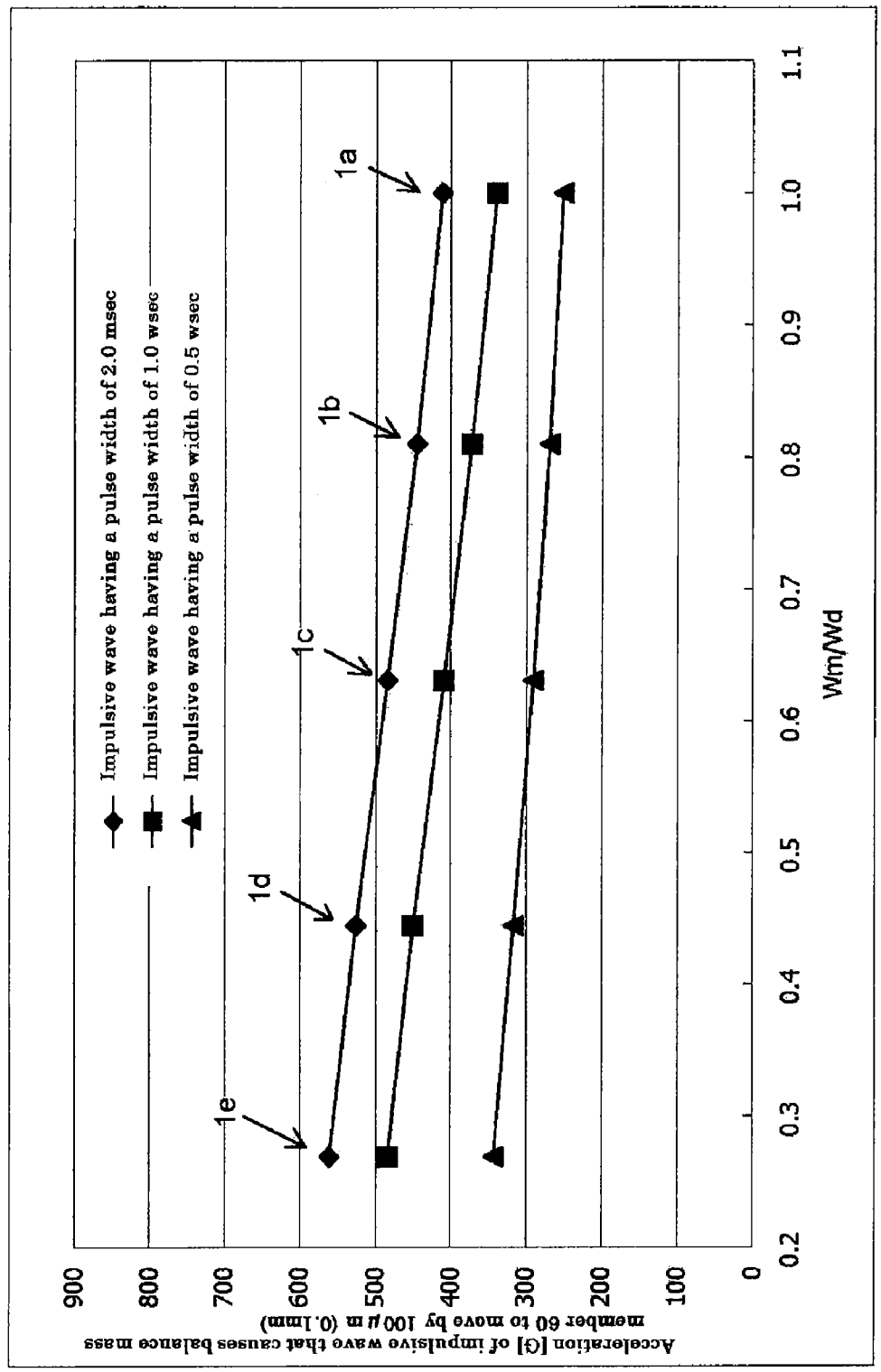
FIG. 7 is a graph showing a result of an analysis for an acceleration of an impulsive wave at the time when a displacement amount of a balance mass member provided in the magnetic head suspension is reached to 100 m (0.1 mm) in a case where the impulsive waves (half-sine wave accelerations) having pulse widths of 0.5 msec, 1.0 msec and 2.0 msec are applied to each of the magnetic head suspensions shown in FIGS. 6(a)-6(e) in such a direction as to press a magnetic head slider toward a disk surface.

That is, impulsive waves (half-sine wave accelerations) having pulse widths of 0.5 msec, 1.0 msec and 2.0 msec were applied to each of the magnetic head suspensions 1a-1e in such a direction as to press the magnetic head suspension toward the disk surface, and accelerations of the impulsive waves were analyzed at the time when displacement amount of the balance mass member 60 toward the disk surface was reached to 100 m (0.1 mm). FIG. 7 is a graph in which the result is shown as dependence of the acceleration of the impulsive wave with respect to Wm/Wd. In this analysis, the fact that acceleration of the impulsive wave that causes the balance mass member 60 to move is high means the fact that the balance mass member 60 is difficult to clash with the disk surface when being subjected to the impulsive force (that is, the higher the acceleration is, the higher the impact resistance regarding the clashing motion of the balance mass member is).

The impulsive wave having a short pulse width corresponds to the impulsive force to which the data storage device is subjected when dropped on a relatively hard surface such as a concrete, and the impulsive wave having a short pulse width corresponds to the impulsive force to which the data storage device is subjected when dropped on a relatively soft surface such as a wood desk.

Figure 8:
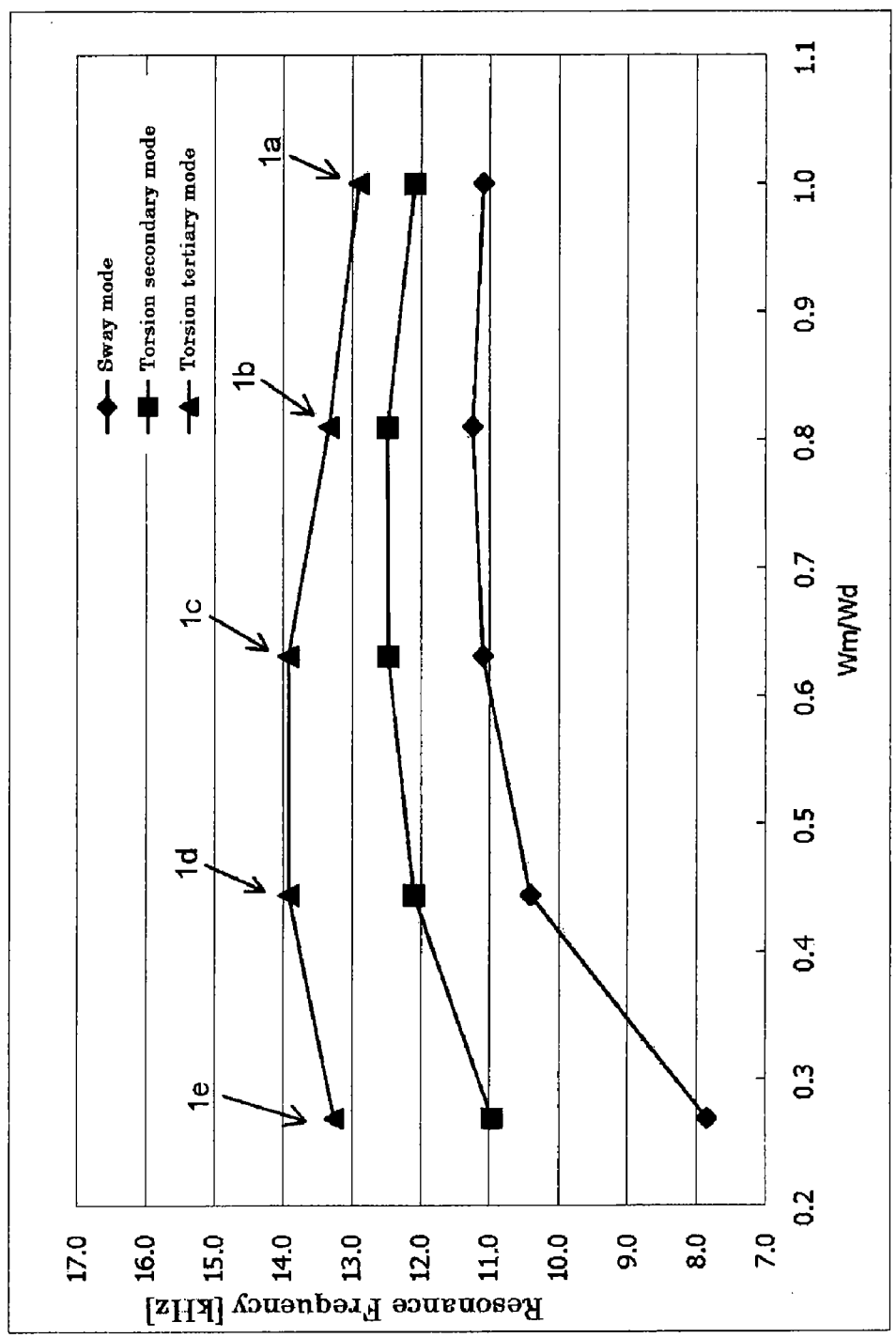
FIG. 8 is a graph showing a result of an analysis for resonance frequency in sway mode, torsion secondary mode and torsion tertiary mode in the magnetic head suspensions shown in FIGS. 6(a)-6(e).

Secondly, analysis regarding resonance frequency in sway mode, torsion secondary mode and torsion tertiary mode was made with respect to each of the magnetic head suspensions 1a-1e. FIG. 8 is a graph in which the result is shown as dependence of the resonance frequency with respect to Wm/Wd.

Lastly, analysis regarding impact resistance against impulsive force having acceleration that causes the magnetic head to jump in a direction separate from the disk surface was made with respect to each of the magnetic head suspensions 1a-1e.

Figure 9:
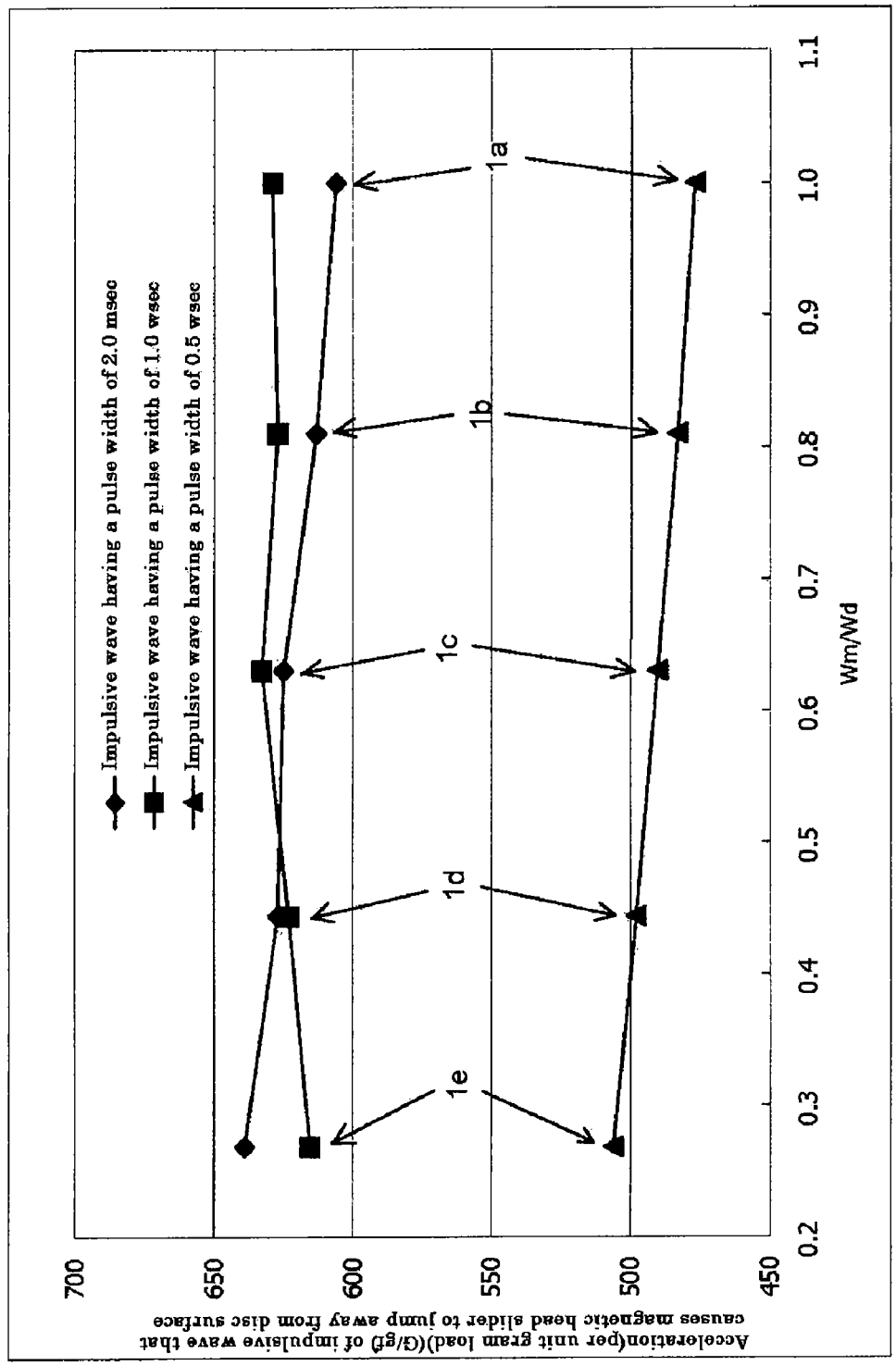
FIG. 9 is a graph showing a result of an analysis for an acceleration of an impulsive wave that causes the magnetic head slider to jump away from the disk surface in a case where the impulsive waves (half-sine wave accelerations) having pulse widths of 0.5 msec, 1.0 msec and 2.0 msec are applied to each of the magnetic head suspensions shown in FIGS. 6(a)-6(e) in such a direction as to press the magnetic head slider away from the disk surface.

That is, impulsive waves (half-sine wave accelerations) having pulse widths of 0.5 msec, 1.0 msec and 2.0 msec were applied to each of the magnetic head suspensions 1a-1e in such a direction that it was separated away from the disk surface, and acceleration of the impulsive wave that caused the magnetic head slider 100 to jump away from the disk surface was analyzed. FIG. 9 is a graph in which the result is shown as dependence of the acceleration causing jumping motion of the magnetic head with respect to Wm/Wd. FIG. 9 shows the acceleration per unit gram load (that is, the acceleration per 1 gf).

It would be understood from FIG. 7 that the smaller Wm/Wd, that is, the narrower width Wm of the narrowest portion 10M makes it possible to effectively prevent the balance mass member 60 to clash with the disk surface when the impulsive wave is applied to the magnetic head suspension.

On the other hand, as shown in FIG. 8, the resonance frequency in sway mode, torsion secondary mode and torsion tertiary mode become higher as Wm/Wd is gradually reduced from 1.0, become highest in the vicinity of Wm/Wd=0.5, and become lower as Wm/Wd is gradually reduced from 0.5.

With respect to the acceleration of the impulsive wave that causes the magnetic head slider 100 to jump away from the disk surface, as shown in FIG. 9, it becomes higher as Wm/Wd becomes smaller in a case of the impulsive wave having a pulse width of 0.5 msec or 2.0 msec, and it is substantially constant in a range where Wm/Wd is higher than 0.5 and becomes lower as Wm/Wd becomes smaller in a range where Wm/Wd is less than 0.5 in a case of the impulsive wave having a pulse widths of 1.0 msec. Specifically, in a case of the impulsive wave having a pulse width of 0.5 msec or 2.0 msec, the impact resistance against the jumping motion of the magnetic head slider is enhanced as Wm/Wd becomes smaller. On the other hand, in a case of the impulsive wave having a pulse width of 1.0 msec, the impact resistance against the jumping motion of the magnetic head slider is worsened as Wm/Wd becomes smaller in the range where Wm/Wd is less than 0.5.

From these analyses, it would be understood that $0.5 \leq Wm/Wd \leq 0.8$ (Wm/Wd is higher than or equal to 0.5 and is lower than or equal to 0.8) is preferable in order to raise the resonance frequency in sway mode and torsion mode while enhancing the impact resistance against both of the jumping motion of the magnetic head slider and the clashing motion of the balance mass member.

Although the explanation in the present embodiment has been made by taking, as an example, a case where the supporting portion 10 has a form of the arm, it is of course that the supporting portion 10 can be formed to be a base plate including a boss portion 10B that is connected to a tip end of an E block (carriage arm) 150 through swage processing (see FIG. 10).

A reference numeral 160 in FIG. 10 is a coil motor functioning as an actuator for driving the E block 150.

This specification is by no means intended to restrict the present invention to the preferred embodiment and the modified embodiment set forth therein. Various modifications to the suspension for supporting the magnetic head slider may be made by those skilled in the art without departing from the spirit and scope of the present invention as defined in the appended claims.

What is claimed is:

1. A magnetic head suspension comprising a load bending portion generating a load for pressing a magnetic head slider toward a disk surface, a load beam portion transmitting the load to the magnetic head slider, a supporting portion supporting the load beam portion through the load bending portion, and a flexure portion connected to the load beam portion and supporting the magnetic head slider, wherein
   (a) the supporting portion includes a main-body portion, and a pair of supporting pieces extending from opposite sides of the main-body portion in a suspension widthwise direction toward a tip-end side in a suspension lengthwise direction so as to define a concave portion therebetween which is opened toward the tip-end side in the suspension lengthwise direction, the supporting pieces being symmetric to each other with a longitudinal center line of the suspension as a reference,
   (b) the magnetic head suspension further comprises an elastically-deformable elastic plate including first and second connected areas which are respectively connected to the pair of supporting pieces and a center area which extends between the first and second connected areas and to which a member forming the load beam portion is connected, the elastic plate functioning as the load bending portion by elastically deformed around a load bending center line along the suspension widthwise direction,
   (c) the magnetic head suspension further comprises a balance mass member supported by a portion of the member forming the load beam portion which is positioned on a base-end side from the elastic plate in the suspension lengthwise direction so as to be positioned within the concave portion in a plan view or as viewed from above,
   (d) the pair of supporting pieces includes supporting areas to which the elastic plate is connected at the first and second connected areas, and arm areas which are positioned on the base-end side in the suspension lengthwise direction from the supporting areas, the arm areas having a width which becomes wider as it advances from the tip-end side to the base-end side in a state that both of its inner side edge and outer side edge come close to the longitudinal center line as they advance from the tip-end side to the base-end side,
   (e) the supporting portion has such a shape that its width becomes narrower according to the shape of the outer side edges of the arm areas as it advances from the tip-end side to the base-end side, becomes narrowest at a narrowest portion and then becomes wider as it advances from the tip-end side to the base-end side after passing the narrowest portion, and
   (f) the narrowest portion is positioned, with respect to the suspension lengthwise direction, between a position of a base-end of the concave portion and a position where phantom lines extending from the inner side edges of the arm areas intersect with the longitudinal center line.

2. A magnetic head suspension according to claim 1, wherein a width Wm between the right and left outer side edges of the narrowest portion and a width Wd between the right and left outer side edges at tip ends of the pair of supporting pieces have a relationship of $0.5 \leq Wm/Wd \leq 0.8$.

3. A magnetic head suspension according to claim 1, wherein the supporting portion is an arm having a base end fixed to a pivot of an actuator.

4. A magnetic head suspension according to claim 1, wherein the supporting portion is a base plate having a base end fixed to a tip end of an E block, which is driven by an actuator.

5. A magnetic head suspension according to claim 1, wherein the center area of the elastic plate includes a center connected portion to which the member forming the load beam portion is connected, a first extending portion extending between the center connected portion and the first connected area, and a second extending portion extending between the center connected portion and the second connected area, the first and second extending portions being symmetrical to each other with the longitudinal center line as a reference.

* * * * *